N. McDONALD.
GUY LINE TIGHTENER.
APPLICATION FILED OCT. 9, 1916.
1,229,302.
Patented June 12, 1917.
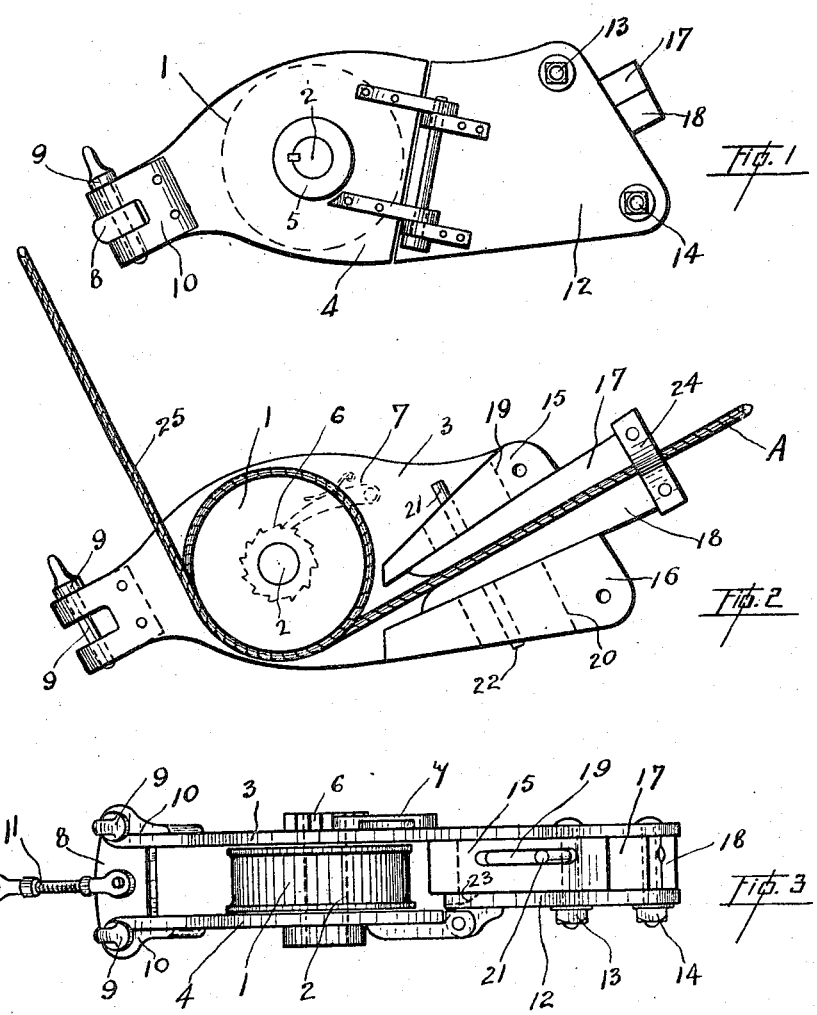
INVENTOR.
NEIL McDONALD

UNITED STATES PATENT OFFICE.

NEIL McDONALD, OF PENDER HARBOUR, BRITISH COLUMBIA, CANADA.

GUY-LINE TIGHTENER.

1,229,302.  Specification of Letters Patent.  Patented June 12, 1917.

Application filed October 9, 1916. Serial No. 124,643.

*To all whom it may concern:*

Be it known that I, NEIL McDONALD, a subject of the King of Great Britain, and a resident of Pender Harbour, in the Province of British Columbia, Canada, have invented certain new and useful Improvements in Guy-Line Tighteners, of which the following is a specification.

My invention relates to improvements in guy line tighteners, and the object of my invention is to provide a simple, strong, and efficient device, the use of which enables guy lines, such as used in logging operations, to be secured, tightened, and maintained tight in a much more simple and convenient manner than obtains at the present time.

I attain this object by the means illustrated in the accompanying drawings in which—

Figure 1 is a side elevation of my device.

Fig. 2 is an elevation of the device, one side being removed.

Fig. 3 is a plan view.

Similar figures of reference indicate similar parts throughout the several views. 1 indicates a sheave secured to a shaft 2 and mounted rotatably between two plates 3 and 4, the shaft 2 extending through the plates and having secured on one end the collar 5, and on the other a ratchet wheel 6, with which wheel coöperates a spring pressed pawl 7, shown in Figs. 2 and 3. The plates 3 and 4 are united at their left hand ends by means of a plate 8, which is detachably held in place by means of screws 9 threaded into lugs 10 rigidly secured to the plates, as shown in Figs. 1, 2, and 3, and the plate 8 is provided with a clevis 11, or any other suitable means whereby the left hand end of the device may be connected to any suitable anchorage.

Plate 3 is continuous throughout the length of the device, but plate 4 is divided intermediate its length, and hingedly connected to its right hand end is a plate 12 adapted to be held in the closed position, as shown in Figs. 1 and 3, by the bolts 13 and 14 which pass through both plates 3 and 12, or to be swung open to expose the wedge blocks 15 and 16 rigidly secured to the inside of plate 3, and the movable wedges 17 and 18 slidably mounted between the blocks 15 and 16, all as shown more particularly in Figs. 2 and 3. 19 and 20 indicate guide slots in the blocks 15 and 16, in which slots operate pins 21 and 22, these pins being rigidly secured into their respective wedges 17 and 18, as shown dotted in Fig. 2. The inside of the plate 12 is cut away, as indicated dotted at 23 in Fig. 2, to allow the plate to clear the side of the wedge blocks when being swung open. 24 indicates a clamp adapted for attachment to the guy line, indicated by the numeral 25 in Fig. 2.

The manner in which my invention is used is as follows:—The device is secured in the desired location by connecting the clevis 11 to a suitable anchorage, such as to the bight of a chain passed around a tree stump. The plate 12 being then swung open the free end A of the guy line 25 is passed, say, three times around the sheave 1 and then carried through between the wedges 17 and 18, which are, of course, spread apart to allow the line to pass between them. The line is now tightened by any suitable means, and while the tightening strain is on the wedges 17 and 18 are tapped inwardly until they are gripping the line, and the plate 12 is swung inwardly and secured by the bolts 13 and 14. The clamp 24 is also carried to bear on the ends of the adjusted wedges and tightened on the line in that position, from which it will be seen that the line cannot now slip and become slack, as when the tightening strain is relieved the reverse pull comes on the clamp 24 and tends to drive in the wedges 17 and 18 so that the grip of the wedges becomes stronger the greater strain there is on the line, which is thus securely held therebetween.

Should it be desired to still further tighten the line at any time, all that is necessary is to pull on the free end A, take up the slack of the wedges, and adjust the clamp to bear on their ends as before.

The pawl and ratchet mechanism already mentioned, and indicated by the numerals 7 and 6 respectively, prevents inadvertent backward rotation of the sheave 1 when tightening the line.

It will be seen therefore that I have devised a simple, strong, and efficient means for enabling guy lines to be secured, tightened, and maintained tight in a convenient and expeditious manner.

What I claim as my invention is:—

1. The combination with a vertical post guy line and direction changing means for the lower end of the said line, of a pair of adjustable wedges mounted adjacent said means and between which the free end of the line is passed after the direction is changed to be gripped by the said wedges when adjusted, and means controlled by the strain on the line to control said wedges and to force them into closer contact with the line as the strain increases.

2. The combination with a vertical post guy line and direction changing means for the lower end of said line, of a pair of adjustable wedges mounted adjacent said means and between which the free end of a guy line wound around the sheave may be passed to be gripped by said wedges when adjusted, and a clamp adapted to be secured to said guy line so as to bear on the large ends of the adjusted wedges.

3. The combination with a vertical post guy line and direction changing means for the lower end of said line, of a pair of suitably supported superposed guide members adjacent said means converging inwardly at their inner ends, a pair of wedges fitted slidably between said guides and between which the free end of a guy line wound around the sheave may be passed, and a clamp secured to said guy line so as to bear on the large ends of the said wedges whereon the strain on the line tends to draw the wedges toward the converging ends of the said guides.

4. A guy line tightener comprising, a pair of parallel plates connected together at both ends, means for changing the direction of the line mounted between said plates, a pair of wedges adjustably mounted between said plates at one end thereof and between which the free end of the line is passed after the direction is changed, the small ends of said wedges being adjacent the said direction changing means and their large ends normally projecting beyond one end of the said plates, and a clamp on the guy line adapted to bear on the large ends of the wedges when said wedges are adjusted to grip the guy line.

5. A guy line tightener comprising, a plate provided on its inner face at one end with an inwardly converging guideway, a second plate arranged parallel to and shorter than the first plate and connected thereto at one end, the other end of said second plate being provided with a normally closed hinged portion adapted to be detachably secured to the side of the said guideway, means for changing the direction of the line mounted between said plates, and a pair of wedges slidably mounted in said guideway and between which the free end of the guy line is passed after its direction is changed.

6. A guy line tightener comprising, a plate provided on its inner face at one end with an inwardly converging guideway, a second plate arranged parallel to and shorter than the first plate and connected thereto at one end, the other end of said second plate being provided with a normally closed hinged portion adapted to be detachably secured to the side of said guideway, means for changing the direction of the line mounted between said plates, a pair of wedges slidably mounted in said guideway between which the free end of the guy line is passed after its direction is changed, and means for retaining said wedges in the guideway.

7. A guy line tightener comprising, a pair of parallel plates connected together at both ends, means for changing the direction of the line mounted between said plates, a pair of wedges adjustably mounted between said plates at one end thereof and between which the free end of the line is passed, a clamp adapted to be secured to said guy line to bear on the large ends of said wedges when said wedges are adjusted, and a pawl and ratchet mechanism adapted to coöperate with said direction changing means and prevent slippage thereof.

8. A guy line tightener comprising, a plate provided on its inner face at one end with an inwardly converging guideway open at both ends and one side, a second plate arranged parallel to and shorter than the first plate and connected thereto at the end remote from the guideway, means for changing the direction of the line mounted between said plates, a pair of wedges slidably mounted in said guideway, and means for closing the open side of the guideway.

9. A guy line tightener, comprising a direction changing means for the line, a gripping device adapted to engage the free portion of the guy line extending from the direction changing means, and means controlled by the strain on the line to control the gripping device and to force it into closer contact with the line as the strain increases.

10. An article of manufacture comprising a guy line tightener having two parallel side plates, wedge means carried between said plates at one end, attaching lugs at the opposite end of said plates, and line direction changing means carried between said plates intermediate their ends.

11. An article of manufacture comprising a guy line tightener having two parallel side plates, one of said plates being in sections with one section hinged to the other, wedge means carried between said plates at one end, attaching lugs at the opposite end of said plates, and line direction changing means carried between said plates intermediate their ends.

12. An article of manufacture comprising a guy line tightener having two parallel side plates, wedge means carried between said plates at one end, means between said plates for adjusting said wedge means, attaching lugs at the opposite end of said plates, and line direction changing means carried between said plates intermediate their ends.

Dated at Welcome Pass, B. C., this 25th day of September, 1916.

NEIL McDONALD.

Copies of this patent may be obtained for five cents each, by addressing the "Commissioner of Patents, Washington, D. C."